Figure 1:
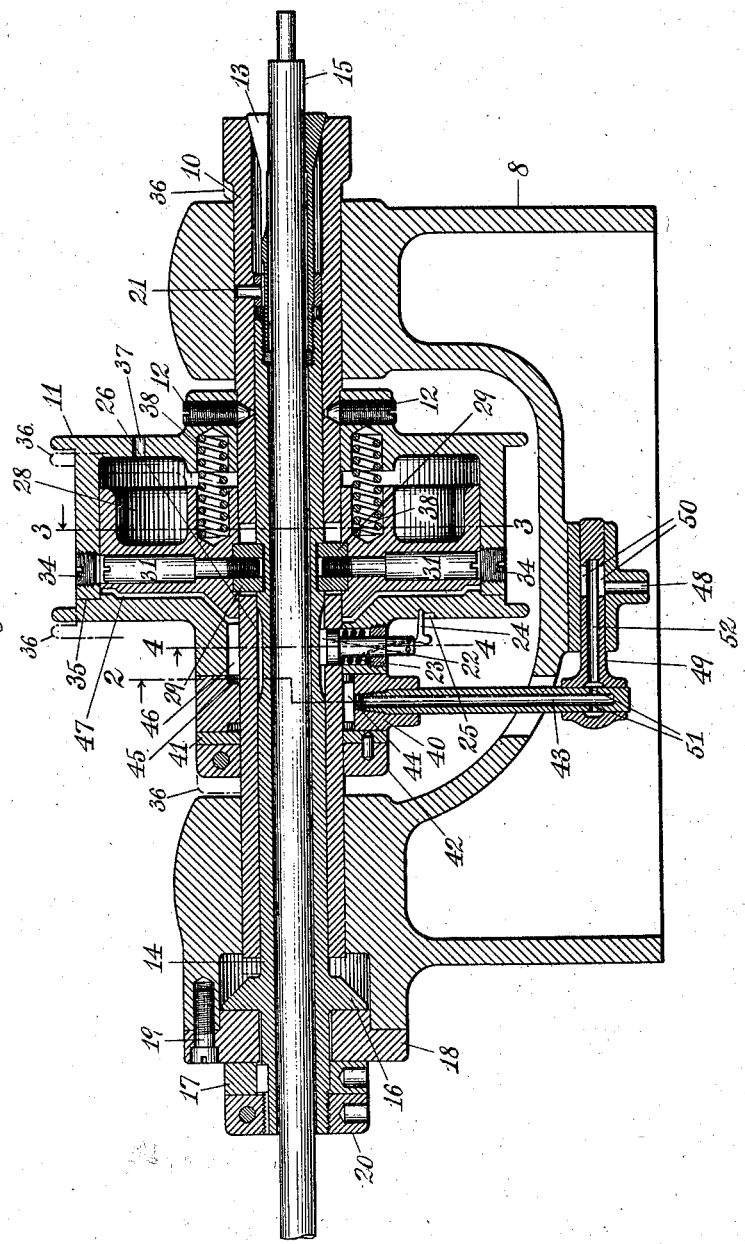

No. 728,458. PATENTED MAY 19, 1903.
B. M. W. HANSON.
FLUID PRESSURE OPERATED CHUCK.
APPLICATION FILED JAN. 15, 1902.
NO MODEL. 2 SHEETS—SHEET 1.

Witnesses:
H. Mallpur
Joseph Merritt

Inventor
B. M. W. Hanson
By W. H. Honiss, Att'y.

No. 728,458. PATENTED MAY 19, 1903.
B. M. W. HANSON.
FLUID PRESSURE OPERATED CHUCK.
APPLICATION FILED JAN. 15, 1902.
NO MODEL. 2 SHEETS—SHEET 2.
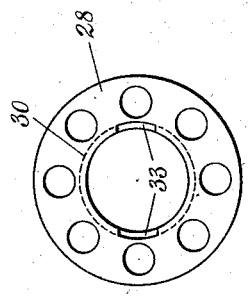
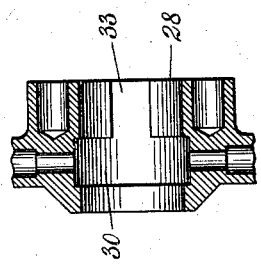
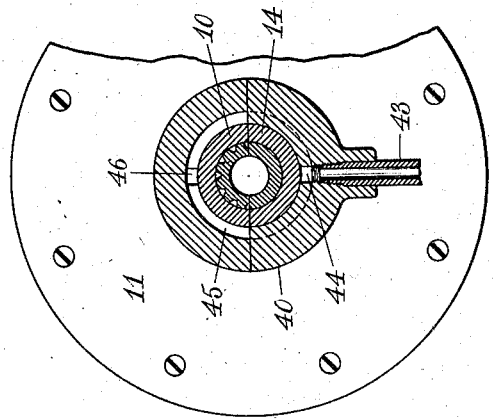
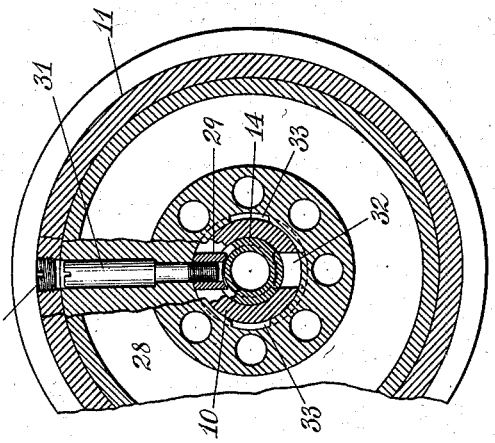
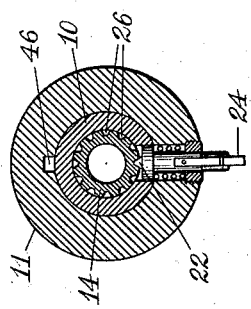
Witnesses:
H. Mallner
Joseph Merritt
Inventor
B. M. W. Hanson
By W. H. Honiss, Att'y.

No. 728,458. Patented May 19, 1903.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FLUID-PRESSURE-OPERATED CHUCK.

SPECIFICATION forming part of Letters Patent No. 728,458, dated May 19, 1903.

Application filed January 15, 1902. Serial No. 89,874. (No model.)

*To all whom it may concern:*

Be it known that I, BENGT M. W. HANSON, a citizen of Sweden, and a resident of Hartford, in the county of Hartford and State of Connecticut, have invented certain new and useful Improvements in Fluid-Pressure-Operated Chucks, of which the following is a specification.

This invention is an improved chuck or work-gripping device especially adapted for rotation and adapted to be operated during rotation at any desired speed without imposing any thrust or frictional resistance to the bearings upon which the chuck may be mounted.

The embodiment of my invention herein shown is adapted for use in connection with lathes, screw-machines, and similar machinery, being herein shown to be adapted for gripping, rotating, and releasing a rod or bar of the stock to be operated upon by tools of various kinds in many well-known ways. In this class of mechanism the collets or chucks are usually operated by means of a plunger which is moved longitudinally of the spindle to open and close the collet or chuck by means of a non-rotating clutch-fork operated by a hand-lever in case of a hand-operated machine or by means of a cam in case of an automatic machine. The longitudinal thrust, which is usually quite considerable, being thus applied by a member extraneous to the spindle must be sustained by means of thrust-collets of the spindle bearing against stationary thrust-bearings, thus causing a corresponding amount of frictional resistance to the rotations of the spindle. The same frictional resistance to rotation also occurs at the bearing between the clutch-fork and the cone which it operates. In other words, the power applied to rotate the spindle must be increased beyond the amount necessary to do the required work by the amount necessary to overcome the friction due to operating the chuck from an extraneous non-rotating member, and that friction is doubled by being applied, first, at the clutch-fork, and, second, at the counteracting thrust-bearings of the spindle. In this invention these thrusts and the consequent resistances are avoided by operating the chuck directly by means of fluid-pressure mechanism carried with or appurtenant to the spindle or chuck itself without any extraneous thrusts or resistances, and therefore requiring for the rotation of the spindle and chuck only the amount of power required to perform the actual operations upon the work.

Figure 1 of the drawings is a side view, in longitudinal section, taken through the center of the spindle. Fig. 2 is an end view in section, taken on the line 2 of Fig. 1. Fig. 3 is an end view in section, taken on the line 3 3 of Fig. 1. Fig. 4 is an end view in section, taken on the line 4 4 of Fig. 1. Fig. 5 is an end view, and Fig. 6 a side view, in longitudinal section, of the hub portion of the abutment or piston for taking the pressure employed in operating the chuck.

The embodiment of my invention herein shown is mounted in a frame or head 8, which may be attached to or integral with the frame of the lathe, screw-machine, or other machine with which the apparatus is to be employed. For convenience of manufacture and assembling this apparatus is made in several parts, which when assembled constitute two principal structures which rotate together; but one of them is moved longitudinally of the other by the pressure devices employed in order to operate the chuck to grip and release the work. One of these two parts is provided with a cylinder and the other part with a piston working in the cylinder, so that when one of the said principal parts is held against longitudinal movement the pressure devices operate the free or movable part. In the present embodiment the parts provided with a piston are held against longitudinal movement, while those attached to the cylinder are moved longitudinally by the pressure, the piston being connected with the collet or jaws for closing upon the work, while the cylinder is connected with means for closing the jaws or collet. The movable parts consist of the hollow spindle 10, mounted in suitable bearings in the frame 8, the forward end of the spindle being adapted to engage with and close the jaws of the collet. This spindle has the cylinder 11 fixed upon it by means of the screws 12. The cylinder may also serve, as herein shown, as a pulley or gear for imparting rotary movement to the chuck, and its left-hand or rearward end is adapted, as will be more fully described, to receive the air-pressure employed for operating the piston.

The chuck herein shown is of a well-known simple form, comprising a spindle and a split collet. The collet 13 is bored or ground out to the nominal diameter of the work and split lengthwise to form the jaws, which are clamped upon the work. The outer end of the collet is tapered and fits in a correspondingly-tapering seat in the front end of the spindle 10, so that by moving the spindle or the collet 13 longitudinally with relation to each other the rod 15 or any other work or tool may be gripped or released. The cylinder and the piston form abutting or opposing parts for applying the pressure to effect the longitudinal movement of the movable member in one direction to operate the chuck and should be of sufficient area for the effective use of fluid-pressure, these members being also utilized herein for the application of the pressure of one or more springs which here operate in the opposite direction for closing the chuck-jaws or collet upon the work. In machines of this class it is customary to push the work forward, either manually or automatically, against a stop, the collet being loosened for this purpose. Where, as is the usual practice, the collet is moved longitudinally to grip the work, it is evident that the latter is also moved longitudinally from the position to which it has been set to an extent varying with the variations in diameter of the work. The well-known practical effect of this is that varying lengths of the work are presented to the tools which operate upon it, so that it is difficult to produce finished work of uniform length from bars or rods of stock which vary to any appreciable extent in diameter, or which are not perfectly uniform in cross-section, or which are covered in any degree with dirt or scale. To obviate this difficulty, I preferably maintain the collet 13 in a constant longitudinal position by means of the thrust-collars 16 and 17 appurtenant to that collet, those collars engaging with a suitable flange or collar 18 of the frame 8 and herein shown to be attached to that frame by means of screws 19. For the adjustment of this thrust-bearing I provide the additional screw - collar 20, which is clamped to place when the bearing is properly adjusted.

In order to enable the collet 13 to be readily removed and collets of other sizes inserted and for the purpose of enabling these collets to be accurately adjusted to longitudinal position for effectively gripping the work, the collet itself does not extend integrally through to its thrust-collars 16 and 17, but is preferably provided with an extension or plunger 14, to which the collet is attached in any convenient way, as by means of the screw-thread shown in Fig. 1. The collet and its plunger both rotate with the main spindle 10, the collet being keyed to that spindle by means of the key 21 engaging with a longitudinal keyway in the collet 13, which permits the longitudinal movement of the latter. The key 21 is preferably provided with a cylindrical stem, which fits a corresponding drilled hole in the main spindle 10. The collet-plunger 14 is made to rotate with the main spindle 10 by means of the key 22, and in order to enable the plunger to be readily unscrewed from the collet provision is made for readily retracting the key 22. To this end that key is made to extend outwardly through the hub of the pulley 11 and is provided with a spring 23, which holds it yieldingly into its keyseats 26 in the plunger 14. The stem of the key is provided with a spring - detent 24, (shown in Figs. 1 and 4,) which engages in a recess 25 in the side of the pulley 11 and serves to latch the key 22 in its closed position, from which it may readily be retracted by withdrawing the detent. In order to enable the collet to be accurately adjusted to its proper gripping position, the plunger 14 is provided with a series of key seats or notches 26, arranged around the periphery of the plunger, as best shown in Fig. 4. For convenience of construction and assembling, the piston 28 is mounted upon the outside of the spindle 10 and is connected with the plunger 14 by means of one or more segmental thrust-blocks 29. (Best shown in Figs. 1 and 3.) These blocks are herein shown to be two in number and are seated upon diametrically opposite sides of the plunger 14, in an annular groove turned therein, forming annular shoulders, by means of which the longitudinal thrust of the pressure against the piston is sustained by the plunger 14. The peripheral portions of these blocks fit in the internal annular groove 30 in the piston 28, and they are secured thereto by means of the screws 31. The shell of the spindle 10, which intervenes between the piston 28 and the plunger 14, is slotted, as shown at 32 in Figs. 1 and 3, to permit the required longitudinal movement of that spindle relative to the collet-plunger, these slots serving as splineways for the blocks, whereby the piston 28 is maintained in constant rotative relation to the spindle 10 and the pulley 11.

In order to facilitate the assembling of the parts, and particularly to enable the segmental key-blocks 29 to be readily inserted, the piston 11 is slotted on opposite sides, as at 33, from the groove 30 to the end of the hub, as best shown in Fig. 6, forming a "bayonet-lock" for the entrance of the blocks from the end of the hub into the grove 30. The blocks may then be placed in position through the slots 32 of the spindle 10 and into the groove of the plunger 14. The piston can then be pushed over the blocks by bringing the slots 33 into coincidence with the blocks. When the piston is pushed far enough to bring the blocks into coincidence with the annular groove 30, the piston is turned until the blocks are substantially at right angles to or at least out of coincidence with the slots 33, as shown in Fig. 3. The screws 31 are then inserted, openings being left through the periphery of the pulley 11 for this purpose, those openings being afterward closed by means of the screw-plugs 34.

The piston 28 is preferably, as here shown, entirely inclosed within the pulley 11, which is made separable at 35 to facilitate the construction and assembling of the parts. With this general construction and arrangement either the piston or the pulley may be moved longitudinally to operate the chuck according as the end-thrust bearing is applied to the main spindle 10 or the collet-plunger 14. For the reasons hereinbefore stated I prefer to apply that thrust-bearing to the collet-plunger, as herein shown, thereby holding the piston against longitudinal movement and moving the cylinder longitudinally.

In the embodiment herein shown the pressure of springs is utilized to close the collet, and the pressure of compressed air or other fluid-pressure is employed to release the collet, as will now be more fully described. The front face of the piston 28 and the adjacent inner face of the pulley 11 are provided with a spring or with a series of springs 38, arranged at substantially equal distances around the spindle, so as to apply the pressure uniformly. The pressure of these springs tends to move the pulley and its main spindle 10 toward the right to grip the collet, as shown in Fig. 1, and as these springs abut against the piston, which is connected with the collet, the strains of operating the chuck are all contained within the rotating parts, so as to cause no frictional resistance whatever to the rotations of the spindle. By suitably proportioning the size, length, number, and amount of compression of these springs almost any desired pressure can be obtained without involving any stress or friction outside of the spindle and the other rotating parts.

The fluid-pressure is admitted to the rotating parts from the non-rotating collar 40, which is fitted upon the outside of the main shaft 10 and is held against the rearward hub of the cylinder 11 by means of the washer 41 and the clamping-collar 42. The fluid-pressure which is admitted from the supply-tube 43 follows through the lateral port 44 into the annular passage 45 in the face of the collar 40, which annular passage communicates at all times with the lateral port 46, leading to the annular clearance-space 47 between the rearward face of the piston 28 and the adjacent inner wall of the pulley 11.

In order to permit the feed-tube 43 to follow the longitudinal movement of its supply-collar 40 and its associated parts, that tube is connected with the supply-opening 48 by means of an intervening telescoping yoke 49, the passages of which are arranged to permit free communication between the supply-inlet 48 and the feed-tube 43 at all positions of the latter. The fluid-pressure is conducted to the inlet 48 in any desired or convenient way, suitable valves being employed to control the admission and exhaustion of the pressure. These controlling-valves may be operated either manually by the attendant or they may be automatically controlled by cams or other devices in proper time and relation to the other operations of the machine with which this apparatus may be employed.

It will be obvious that the fluid-pressure devices which are herein shown to be applied to one side of the piston 28 for releasing the collet may also be applied to the other side of that piston for closing the collet, thus dispensing with the springs 38 and operating the collet in both directions by means of fluid-pressure, or the application herein shown may be reversed and the springs employed for opening the collet, the air-pressure being employed for closing the collet. This may be done either by transposing the position of the springs 38 and the fluid-pressure from their respective sides of the piston 28 or, still more easily, by reversing the taper of the coengaging portions of the main spindle 10 and the collet 13.

In the absence of other controlling considerations I consider it preferable to employ the springs for holding the clutch in its closed position, to grip and carry the work especially where it is desirable, as in most cases, to economize in the use of the fluid-pressure, which in such an arrangement would be employed only during the short period required for opening the chuck and moving the work forward, and would be shut off during the much more extended time that is usually required for performing the cutting or other operations upon the work.

Various forms of well-known devices may be employed for advancing the work when the collet is loosened, either automatically or otherwise. When arranged to operate automatically, the work-advancing devices should obviously be timed in coincidence with the loosening of the collet, as in the case of the well-known automatic screw-machine now operated by mechanical contrivances.

If for any reason it should be found objectionable to move the cylinder 11 and its main spindle 10 longitudinally, the longitudinal movement may be imparted to the collet by applying thrust-collars to the spindle 10 upon opposite sides of one of its bearings or by inserting a thin collar between the front end of the hub of the pulley and the face of the adjacent bearing and employing either a solid or a detachable collar upon the spindle 10 adjacent to the front face of that bearing. Then by removing the thrust-collars 16 and 17 of the collet-plunger or the coöperating flange 18 of the head the collet and its attached piston 28 will then move longitudinally of the spindle and operate the collet. In many ways well known to those familiar with this art the invention herein shown may be modified and its applications greatly extended.

I claim as my invention—

1. The combination of a head or frame, a rotatable spindle journaled thereon, a work-gripping collet extending axially within the spindle and provided with thrust-collars engaging with the head or frame to prevent longitudinal movement of the collet, and a fluid-pressure piston and cylinder mounted upon and rotating with the spindle and operably connected with the collet and with the spindle, respectively.

2. The combination of a head or frame, a rotatable spindle journaled thereon, a work-gripping collet carried by the spindle and provided with thrust-collars engaging with the head or frame to prevent longitudinal movement of the collet, and a fluid-pressure cylinder and piston carried by the spindle and means for connecting the piston and the collet through the shell of the spindle.

3. The combination of a head or frame, a rotatable spindle journaled thereon, a work-gripping collet extending axially through the spindle, and provided with thrust-collars engaging with the frame to prevent longitudinal movement of the collet, a fluid-pressure cylinder and piston mounted on the spindle to rotate therewith, means for connecting the piston with the collet through the shell of the spindle, a spring device interposed between the cylinder and one side of the piston, and means for admitting fluid-pressure to the cylinder at the opposite side of the piston to overcome the pressure of the spring device.

4. The combination of a rotatable spindle, a work-gripping collet carried by the spindle, and extending axially therein, a pressure-cylinder mounted upon and rotating with the spindle, a piston within the cylinder provided with thrust-blocks passing through the wall of the spindle, and engaging with the collet, means for applying spring-pressure to effect the relative longitudinal movement of the spindle and collet in one direction, and means for applying fluid-pressure to the piston to overcome the pressure of the spring and effect the said relative movement in the opposite direction.

5. The combination of a rotatable spindle, a collet carried thereby, and extending axially therein, a piston for fluid-pressure mounted upon the spindle, and provided with a circumferential seat for a thrust-block, and having a longitudinal slot for admitting the thrust-block to its seat, a thrust-block located in said seat, and extending through the wall of the spindle into engagement with the collet, means for applying spring-pressure to effect the rotative longitudinal movement of the spindle and collet in one direction, and means for applying fluid-pressure to the piston to overcome the pressure of the spring, and effect the said relative movement in the opposite direction.

6. The combination of a rotatable spindle, a work-gripping collet carried by the spindle, a plunger connected with the collet by a screw-thread, and extending axially within the spindle, means for preventing relative rotation of the collet and the spindle, a retractable key carried by the spindle and engaging with the plunger, and a circumferential series of notches on the plunger for the engagement of the said retractable key.

7. The combination of a rotatable spindle, a work-gripping collet carried by the spindle, a plunger connected with the collet by a screw-thread and mounted axially within the spindle, and provided with a circumferential series of detent-notches, means for preventing relative rotation of the collet and the spindle, a retractable key carried by the spindle for engaging with the detent-notches of the plunger, and a fluid-pressure cylinder and piston carried by the spindle, the piston being connected with the plunger by means of a thrust-bearing.

8. In combination with a rotatable work-gripping chuck, an engine rotating with the chuck, and means for transmitting fluid-pressure to the piston, comprising a non-rotating collar, provided with an inlet for the pressure, and provided on its opposite faces with annular passages communicating with the inlet, one of the said annular passages communicating also with the pressure-space of the engine, and an adjustable collar for taking up the wear, and preventing leakage of the pressure fluid.

9. In combination with a rotatable work-gripping chuck, a fluid-pressure engine rotating with the chuck, and means for transmitting fluid-pressure to the engine, comprising a non-rotating collar, mounted between shoulders of the chuck, and provided with an inlet for the pressure, the collar being also provided with annular passages, communicating with the inlet and opening with equal areas upon its opposite sides, against the said shoulders of the chuck, one of the said annular passages communicating with the pressure-space of the engine, and an adjustable collar for taking up the wear and preventing leakage of the pressure fluid.

10. In combination with a rotatable work-gripping chuck, a fluid-pressure engine rotating with, and for operating the chuck, and means for transmitting fluid-pressure to the engine, comprising a non-rotating collar mounted between the shoulders of the chuck, and provided with an inlet for the pressure, and provided with annular passages around the side faces of the collar, and opening with equal areas upon its opposite sides against the said shoulders of the chuck, one of the said annular passages communicating with the pressure-space of the engine, and one of the said shoulders being adjustable longitudinally against the non-rotating collar to take up the wear and prevent leakage of the pressure.

Signed at Hartford, Connecticut, this 11th day of January, 1902.

BENGT M. W. HANSON.

Witnesses:
 F. V. BARTLETT,
 WM. H. HONISS.